(12) United States Patent
Lombard et al.

(10) Patent No.: US 8,113,770 B2
(45) Date of Patent: Feb. 14, 2012

(54) TURBINE ASSEMBLY FOR AN EXHAUST GAS-DRIVEN TURBOCHARGER HAVING A VARIABLE NOZZLE

(75) Inventors: Alain Lombard, Thaon les Vosges (FR); Nicolas Serres, Thaon les Vosges (FR); Michael Ladonnet, Thaon les Vosges (FR)

(73) Assignee: Honeywell International Inc., Morristown, NJ (US)

( * ) Notice: Subject to any disclaimer, the term of this patent is extended or adjusted under 35 U.S.C. 154(b) by 535 days.

(21) Appl. No.: 12/364,715

(22) Filed: Feb. 3, 2009

(65) Prior Publication Data

US 2010/0196145 A1 Aug. 5, 2010

(51) Int. Cl.
*F01B 25/20* (2006.01)
*F01D 17/00* (2006.01)
*F04D 29/40* (2006.01)

(52) U.S. Cl. .................. 415/166; 415/145; 415/158
(58) Field of Classification Search .................. 415/144, 415/145, 157, 158, 159, 166, 167
See application file for complete search history.

(56) References Cited

U.S. PATENT DOCUMENTS

| | | | |
|---|---|---|---|
| 2,648,195 A | 8/1953 | Wilde et al. | |
| 4,867,637 A | 9/1989 | Hayama | |
| 5,146,752 A * | 9/1992 | Bruestle | 60/602 |
| 5,372,485 A * | 12/1994 | Sumser et al. | 417/407 |
| 5,454,225 A | 10/1995 | Sumser et al. | |
| 5,855,117 A * | 1/1999 | Sumser et al. | 60/602 |
| 6,374,611 B2 * | 4/2002 | Doring et al. | 60/605.1 |
| 7,249,930 B2 * | 7/2007 | Lombard et al. | 415/145 |
| 7,272,929 B2 * | 9/2007 | Leavesley | 60/602 |
| 7,458,764 B2 * | 12/2008 | Lombard et al. | 415/1 |
| 2003/0029168 A1 * | 2/2003 | Hercey et al. | 60/602 |
| 2005/0091976 A1 * | 5/2005 | Whiting | 60/602 |
| 2007/0122267 A1 | 5/2007 | Lombard et al. | |
| 2007/0169479 A1 * | 7/2007 | Nicolle et al. | 60/612 |
| 2008/0038110 A1 * | 2/2008 | Roberts et al. | 415/191 |
| 2008/0317593 A1 * | 12/2008 | Lombard et al. | 415/224 |
| 2009/0183506 A1 * | 7/2009 | Trombetta et al. | 60/599 |
| 2009/0224190 A1 * | 9/2009 | Dale et al. | 251/129.06 |

FOREIGN PATENT DOCUMENTS

| | | |
|---|---|---|
| EP | 0598174 A1 | 3/1993 |
| SU | 715812 | 2/1978 |
| WO | 2004074643 | 9/2004 |
| WO | 2007058647 | 5/2007 |

OTHER PUBLICATIONS

Search Report and Written Opinion for PCT/US2010/053503 dated Jul. 27, 2011.

* cited by examiner

*Primary Examiner* — Benjamin Sandvik
*Assistant Examiner* — Joseph Schoenholtz
(74) *Attorney, Agent, or Firm* — Alston & Bird LLP

(57) ABSTRACT

A turbocharger with an exhaust gas-driven turbine includes a variable nozzle formed by a stator supporting fixed vanes and defining bypass openings, and a rotor supporting movable vanes and defining bypass channels. Each fixed vane overlaps with a movable vane by a varying extent dependent on rotational position of the rotor. In a fully open position of the rotor, the movable vanes have a maximum extent of overlap with the fixed vanes, and the bypass channels align with the bypass openings so that some of the exhaust gas flows through the aligned bypass openings and channels, bypassing the turbine wheel.

16 Claims, 12 Drawing Sheets

TURBINE ASSEMBLY FOR AN EXHAUST GAS-DRIVEN TURBOCHARGER HAVING A VARIABLE NOZZLE

BACKGROUND OF THE INVENTION

The present disclosure relates to exhaust gas-driven turbochargers having variable turbine nozzles, and relates in particular to variable nozzles having the capability of bypassing some of the exhaust gas around the turbine wheel.

Regulation of the exhaust gas flow through the turbine of an exhaust gas-driven turbocharger provides known operational advantages in terms of improved ability to control the amount of boost delivered by the turbocharger to the associated internal combustion engine. The regulation of exhaust gas flow is accomplished by incorporating variable geometry into the nozzle that leads into the turbine wheel. By varying the size of the nozzle flow area, the flow into the turbine wheel can be regulated, thereby regulating the overall boost provided by the turbocharger's compressor.

Variable-geometry nozzles for turbochargers generally fall into two main categories: variable-vane nozzles, and sliding-piston nozzles. Vanes are often included in the turbine nozzle for directing the exhaust gas into the turbine in an advantageous direction. Typically a row of circumferentially spaced vanes extend axially across the nozzle. Exhaust gas from a generally annular chamber surrounding the turbine wheel flows generally radially inwardly through passages between the vanes, and the vanes turn the flow to direct the flow in a desired direction into the turbine wheel. In most variable-vane nozzles, the vanes are rotatable about their axes to vary the angle at which the vanes are set, thereby varying the flow area of the passages between the vanes.

In the sliding-piston type of nozzle, the nozzle may also include vanes, but the vanes are fixed in position. Variation of the nozzle flow area is accomplished by an axially sliding piston that slides in a bore in the turbine housing. The piston is tubular and is located just radially inwardly of the nozzle. Axial movement of the piston is effective to vary the axial extent of the nozzle leading into the turbine wheel, thus varying the "throat area" at the turbine wheel inlet. When vanes are included in the nozzle, the piston can slide adjacent to radially inner (i.e., trailing) edges of the vanes; alternatively, the piston and vanes can overlap in the radial direction and the piston can include slots for receiving at least a portion of the vanes as the piston is slid axially to adjust the nozzle.

There are times during the operation of a turbocharger when it is desired to pass as much flow through the turbine as possible. For example, it may be desirable to minimize the backpressure felt by the engine during certain operating conditions, and this is accomplished by reducing the flow restriction downstream of the engine as much as possible. In a sliding piston-type variable turbine nozzle, the downstream flow restriction is reduced by fully opening the piston to maximize the throat area at the turbine wheel inlet. However, in some cases, even fully opening the piston may not allow as much flow to pass as may be desired. Accordingly, some piston-type variable nozzles are configured to have a bypass passage that is opened when the piston is slid to a fully open position. The bypass passage extends between the generally annular chamber of the turbine housing and the bore in the turbine housing, such that exhaust gas flows from the chamber to the bore, bypassing the turbine wheel. Some turbines with variable-vane nozzles similarly include a bypass valve for bypassing the turbine wheel.

Both the variable-vane and sliding piston types of variable nozzles have advantages and disadvantages. For example, variable-vane nozzles having rotatable vanes generally have good aerodynamic performance, but are mechanically complex because of the substantial number of moving parts. Sliding piston-type variable nozzles are mechanically much simpler, having far fewer moving parts, but generally are not as good aerodynamically as variable-vane nozzles.

There is a third category of variable nozzle, represented for example by international patent application publication WO 2004/074643 to Lombard et al., in which the variable nozzle includes vanes each of which is made up of a fixed leading-edge portion (a fixed vane) and a movable trailing-edge portion (a movable vane). The movable vanes are supported on a rotor that is rotated about its axis to vary the positions of the movable vanes relative to the fixed vanes. This design offers mechanical simplicity combined with some of the advantages of vane-type nozzles.

BRIEF SUMMARY OF THE DISCLOSURE

The present disclosure concerns an improvement to the type of variable nozzle described in the aforementioned WO '643 publication. In particular, the present disclosure relates to a variable nozzle arrangement having an integrated bypass that requires no additional parts beyond those already needed for varying the nozzle flow area.

In accordance with one embodiment described herein, a turbine assembly for an exhaust gas-driven turbocharger having a variable nozzle comprises:

a turbine housing defining a generally annular chamber extending circumferentially about a longitudinal axis of the turbine housing, the turbine housing defining a bore extending along the longitudinal axis;

a turbine wheel disposed in the turbine housing;

a nozzle passage leading from the chamber radially inwardly into the turbine wheel, the nozzle passage being defined between two walls spaced apart in a longitudinal direction; and a variable nozzle assembly comprising (1) a stator that is fixed in a rotational sense with respect to the turbine housing and that defines a plurality of circumferentially spaced fixed vanes extending into the nozzle passage, the stator defining at least one bypass opening that is exposed to exhaust gas within the chamber; and (2) a rotor that is rotational with respect to the turbine housing about the longitudinal axis, the rotor defining at least one bypass channel having an inlet and an outlet, the outlet being in fluid communication with the bore at a position spaced downstream from the nozzle passage with respect to flow of exhaust gas through the bore, and wherein the rotor is rotatable between a closed position in which the inlet is closed by the stator and an open position in which the inlet is aligned with the bypass opening in the stator such that exhaust gas flows from the chamber through the bypass opening and through the bypass channel into the bore, bypassing the turbine wheel.

In one embodiment, the stator includes a tubular portion that extends circumferentially about the longitudinal axis and defines a plurality of circumferentially spaced bypass openings, and the rotor includes a tubular portion that extends circumferentially about the longitudinal axis and defines a plurality of circumferentially spaced bypass channels that are closed by the stator when the rotor is in the closed position and that are respectively aligned with the bypass openings when the rotor is in the open position.

The rotor advantageously defines a plurality of circumferentially spaced movable vanes each of which overlaps in a circumferential direction with a respective one of the fixed vanes to form a composite vane having a leading-edge portion defined by the fixed vane and a trailing-edge portion defined by the movable vane. Rotation of the rotor about the longitudinal axis is effective to vary the degree of overlap between the fixed and movable vanes, thereby varying the flow area of the nozzle. The movable vanes have a maximum degree of overlap with the fixed vanes (and hence flow area is a maximum) in the open position of the rotor, and have a minimum degree of overlap with the fixed vanes (and hence flow area is a minimum) in the closed position of the rotor.

In one embodiment, the turbine assembly further comprises a stop for limiting rotation of the rotor between predetermined closed and open positions. The stop can comprise a projection from one of the rotor and stator that is disposed in an opening defined in the other of the rotor and stator, the projection abutting one end of the opening to define the open position of the rotor and abutting an opposite end of the opening to define the closed position of the rotor.

It is also possible for the stator to include an integral locating projection that engages a receptacle defined in the turbine housing so as to place the stator in a predetermined rotational orientation with respect to the turbine housing.

The turbine assembly can further comprise an actuator linkage coupled with the rotor for imparting rotational movement to the rotor. In one embodiment, the actuator linkage includes a rotary member that extends generally radially inwardly through a wall of the turbine housing and is rotational about a generally radial axis, and an arm that has one end attached to the rotary member and an opposite end engaged with the rotor, such that rotation of the rotary member about the generally radial axis causes the arm to pivot and impart rotational movement to the rotor.

In accordance with one embodiment described herein, the tubular portion of the rotor has a radially outer surface and a radially inner surface, and the tubular portion of the stator has a radially inner surface that contacts the radially outer surface of the tubular portion of the rotor and forms a bearing surface for the rotor. The tubular portion of the stator can include a generally conical portion at an upstream end of the stator and a generally cylindrical portion at a downstream end of the stator, and the tubular portion of the rotor correspondingly can include a generally conical portion at an upstream end of the rotor and a generally cylindrical portion at a downstream end of the rotor. The bypass openings can be defined in the conical portion of the stator and the inlets of the bypass channels can be defined in the conical portion of the rotor.

In one embodiment, an upstream portion of each bypass channel adjacent the inlet thereof extends in a direction having a circumferential component.

The outlets of the bypass channels can be defined in an end surface of the rotor that extends between the radially outer and inner surfaces at the downstream end of the rotor. The bypass channels can be configured to discharge exhaust gas from the outlets of the bypass channels into the bore in the turbine housing in a generally axial direction.

In one embodiment, the stator has a radially outer surface that defines part of the generally annular chamber, the turbine housing defining the remainder of the generally annular chamber. Additionally, one of the walls defining the nozzle passage is constituted entirely by the stator and the rotor.

The turbine assembly in accordance with the present disclosure offers a number of advantages, including an ability to regulate turbine flow using a single moving part (the rotor), an integrated bypass functionality that does not require any additional parts, and mechanical simplicity.

BRIEF DESCRIPTION OF THE SEVERAL VIEWS OF THE DRAWING(S)

Having thus described the disclosure in general terms, reference will now be made to the accompanying drawings, which are not necessarily drawn to scale, and wherein:

DETAILED DESCRIPTION OF THE DRAWINGS

The present invention now will be described more fully hereinafter with reference to the accompanying drawings in which some but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

FIGS. 1-9 depict a turbocharger 100 and/or components thereof, in accordance with one embodiment of the present invention. The turbocharger includes a compressor housed by a compressor housing 110, a center housing 120 connected to the compressor housing for containing bearings for the rotating shaft of the turbocharger, and a turbine housed by a turbine housing 130. The present invention mainly concerns the turbine portion of the turbocharger, and thus details of the compressor portion and center housing components are not included herein for sake of brevity.

Figure 1:
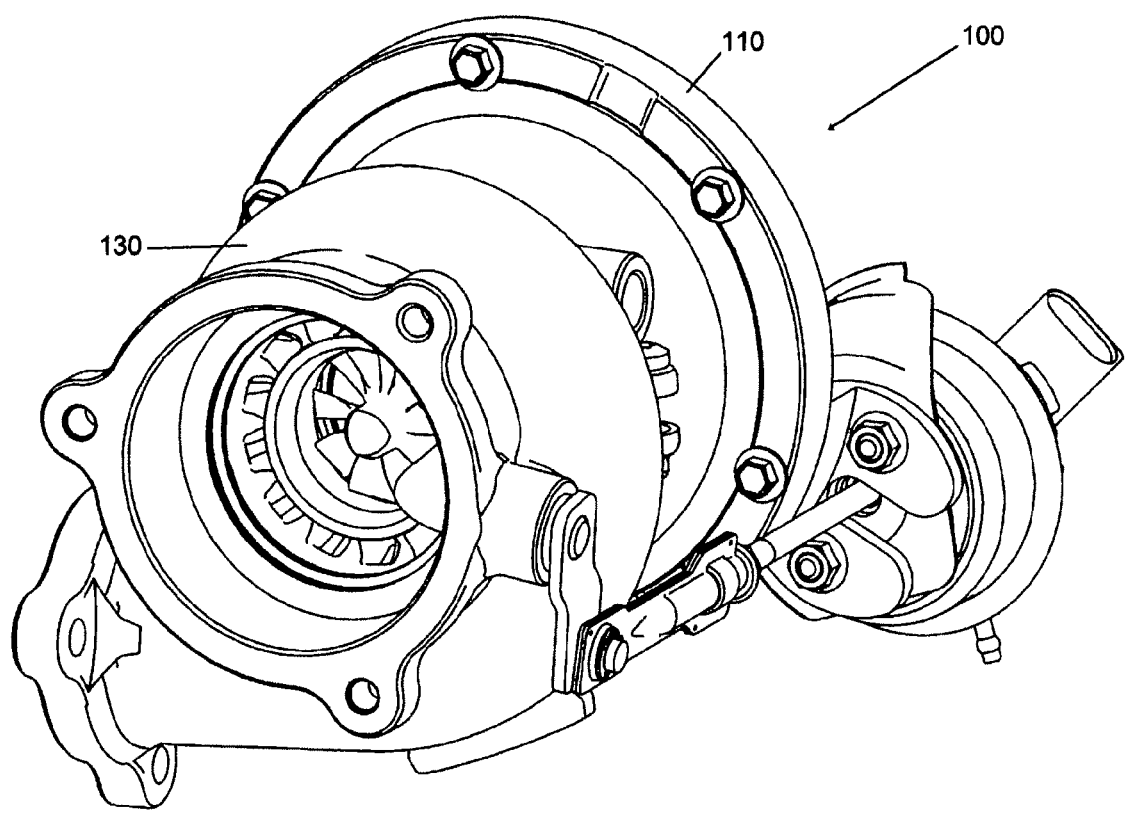
FIG. 1 is a perspective view of a turbocharger in accordance with an embodiment of the invention.
Figure 2:
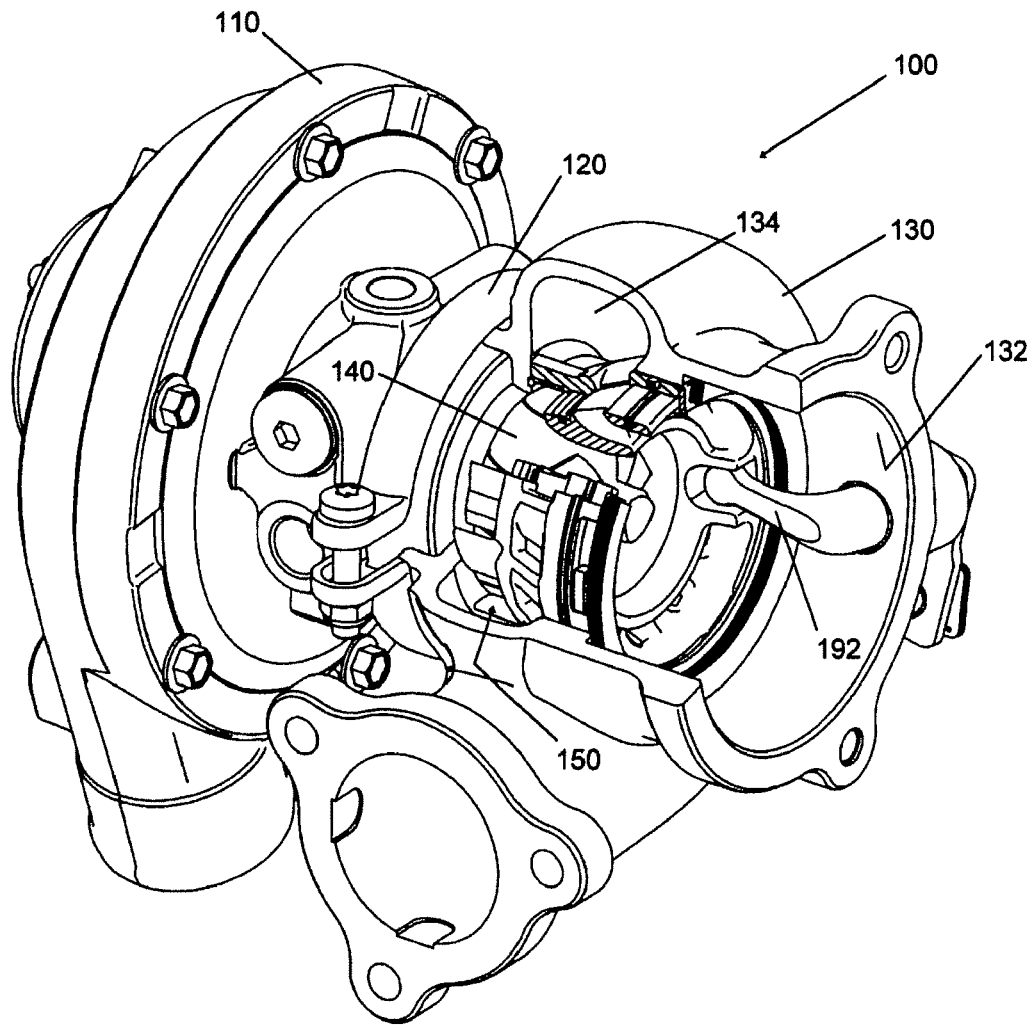
FIG. 2 is a perspective view of the turbocharger of FIG. 1, partially cut away to show details of the turbine assembly.
Figure 3:
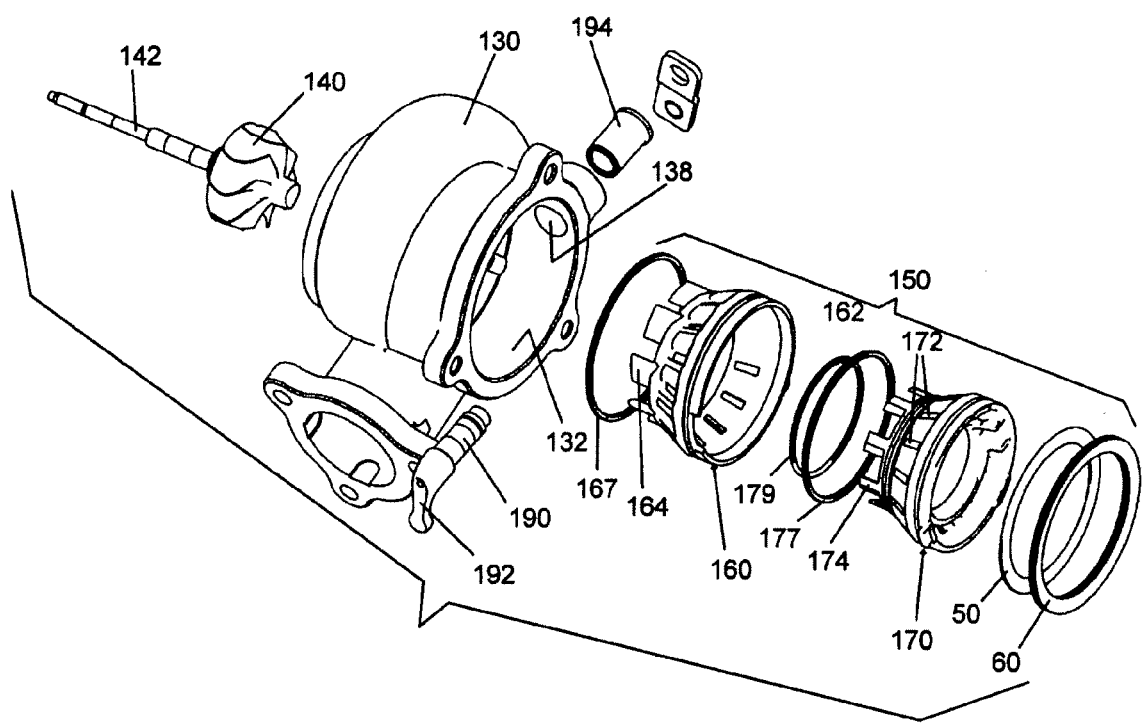
FIG. 3 is an exploded view of the turbine assembly in accordance with an embodiment of the invention.

With reference primarily to FIGS. 2-4, the turbine housing 130 contains a turbine wheel 140 that is affixed to one end of a shaft 142, the other end of which is affixed to a compressor wheel (not shown) disposed in the compressor housing. The turbine wheel is located in an axial bore 132 defined by the turbine housing 130. The turbine housing defines a generally annular chamber 134 that surrounds the turbine wheel 140. A nozzle passage 136 is defined at a radially inner side of the chamber 134 through which exhaust gas in the chamber flows radially inwardly to the turbine wheel 140. The exhaust gas passes between the blades of the turbine wheel and is turned to flow axially along the bore 132 and exit the turbine housing.

The turbocharger 100 includes a variable nozzle 150 of variable geometry for regulating the flow of exhaust gas through the nozzle. The variable nozzle is now described with reference primarily to FIGS. 4-9. The variable nozzle comprises a stator 160 that is fixed in a rotational sense with respect to the turbine housing 130. The stator includes a tubular portion that extends circumferentially about the longitudinal axis of the turbocharger and defines a plurality of circumferentially spaced bypass openings 162 that are exposed to exhaust gas within the chamber 134. The stator also defines a plurality of circumferentially spaced fixed vanes 164 joined to the tubular portion and extending axially therefrom, into the nozzle passage 136. The tubular portion of the stator 160 includes a generally cylindrical portion 166 joined to a generally conical portion 168. The generally cylindrical portion 166 fits into portion of the bore 132 of the turbine housing and a sealing ring 167 is disposed in a groove defined in a radially outer surface of the generally cylindrical portion 166 for sealing against a radially inner surface of the turbine housing. The generally conical portion 168 extends from the generally cylindrical portion in an axially forward (i.e., toward the compressor section of the turbocharger) and radially inward direction. The bypass openings 162 are defined in the generally conical portion 168 of the stator 160.

Figure 4A:
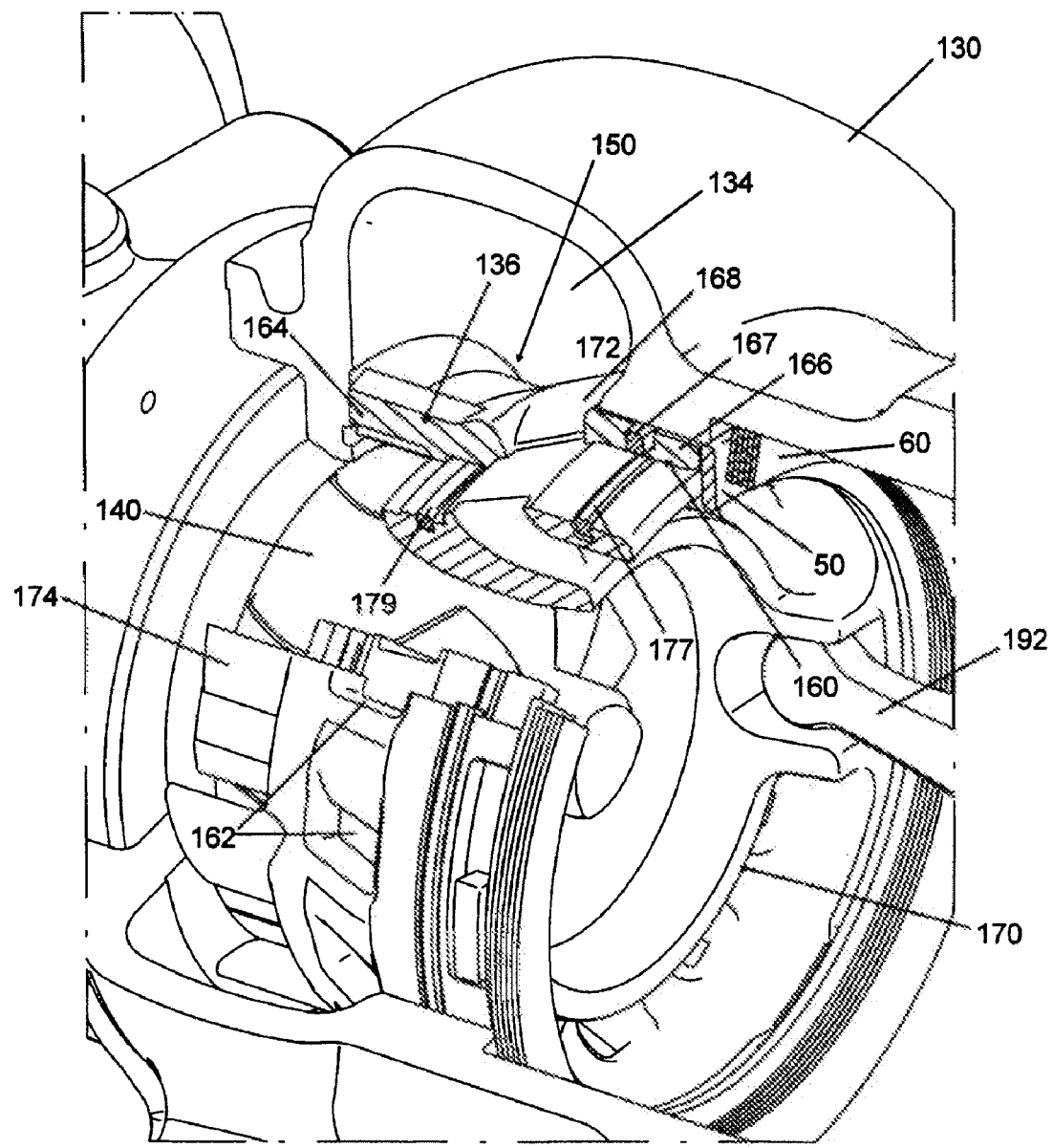
FIG. 4A is a magnified portion of FIG. 2, showing the turbine assembly in a closed position of the variable nozzle assembly.
Figure 4B:
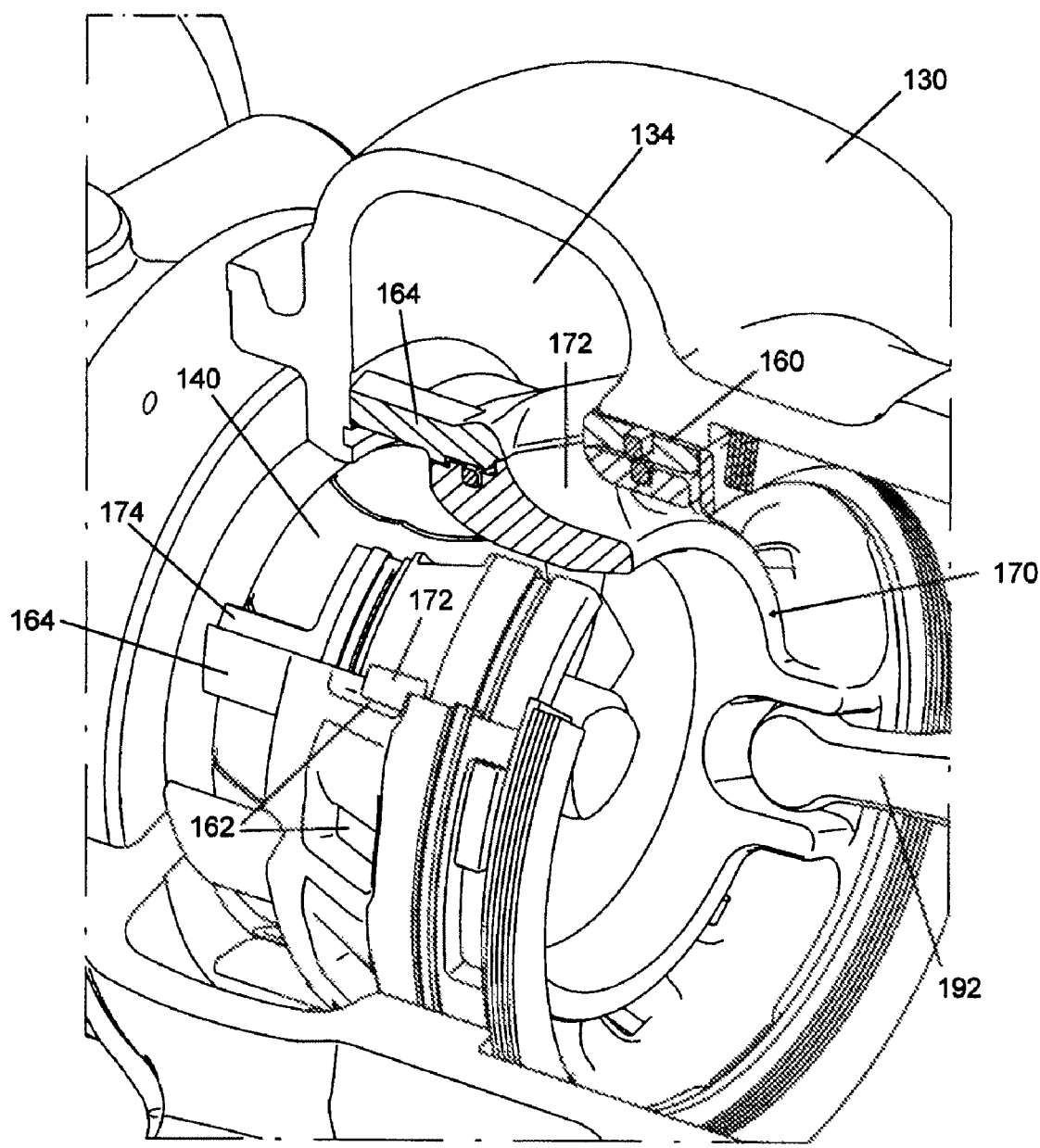
FIG. 4B is similar to FIG. 4A, showing the variable nozzle assembly in an open (bypass) position.
Figure 5A:
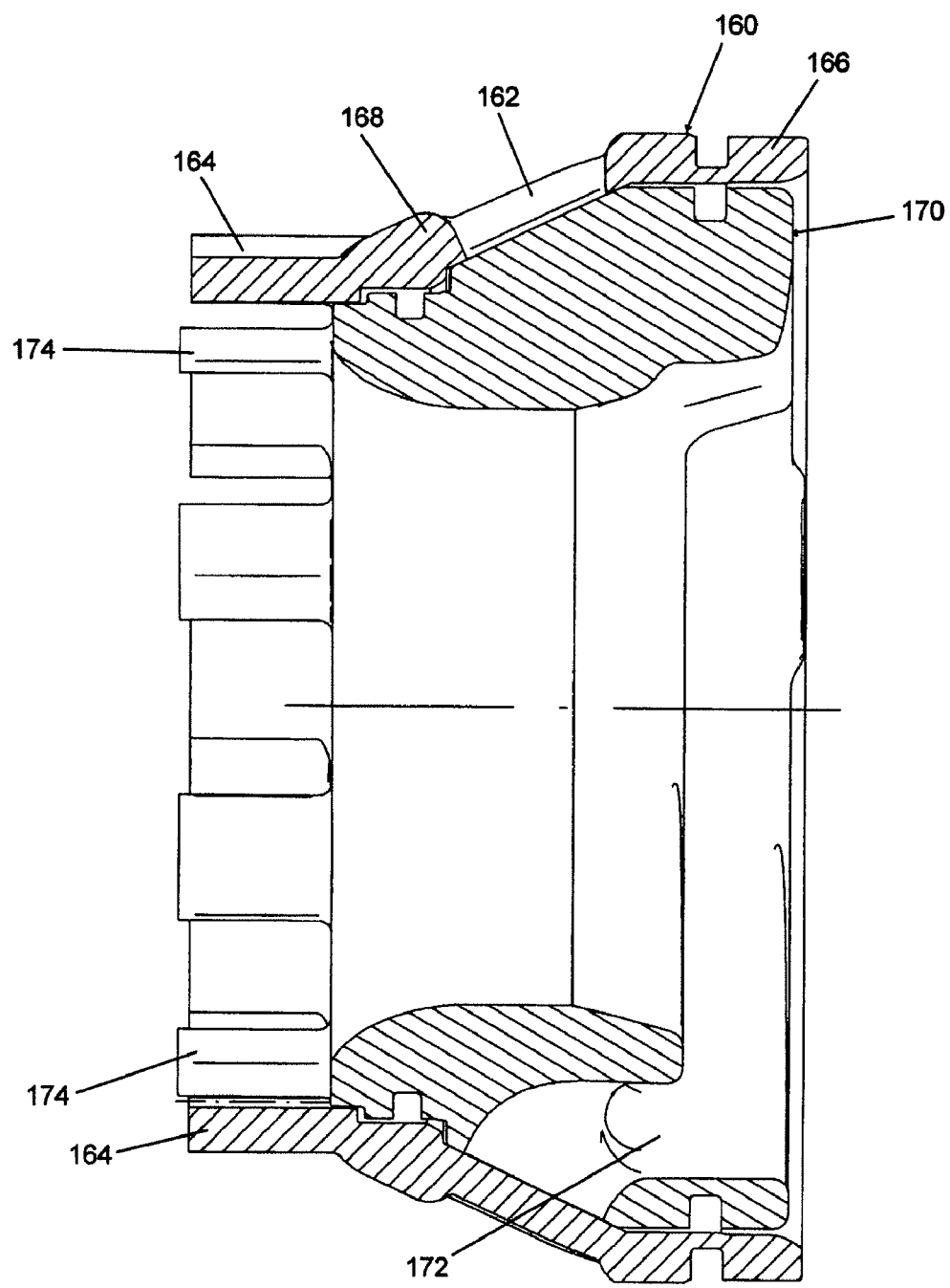
FIG. 5A is a cross-sectional view of the variable nozzle assembly in the closed position.
Figure 5B:
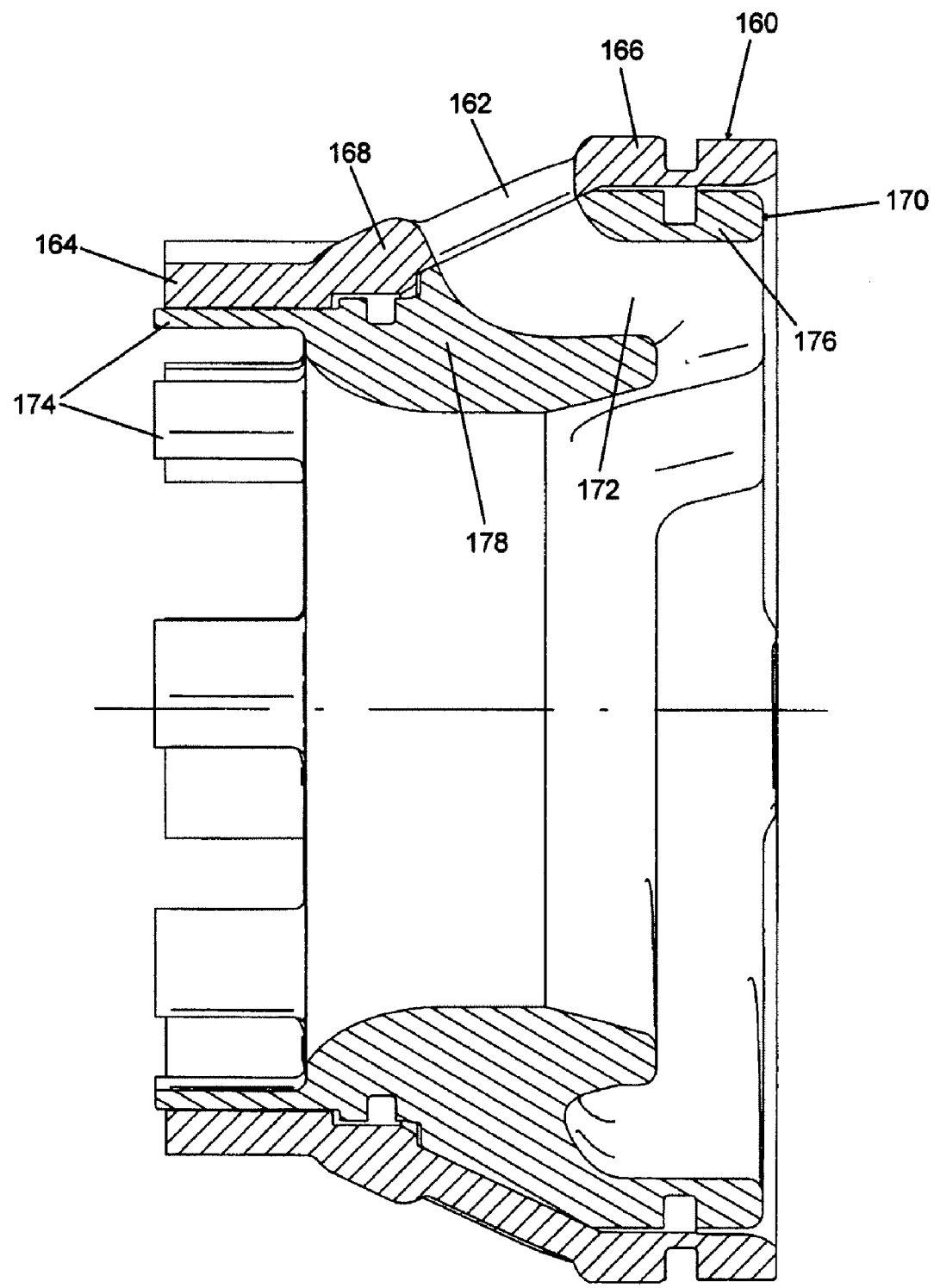
FIG. 5B is similar to FIG. 5A, with the variable nozzle assembly in the open (bypass) position.

The variable nozzle further comprises a rotor 170 that is rotational with respect to the turbine housing 130 about the longitudinal axis of the turbocharger. The rotor includes a tubular portion that extends circumferentially about the longitudinal axis and defines a plurality of circumferentially spaced bypass channels 172 that are closed by the stator 160 when the rotor is in a closed position (FIGS. 4A and 5A) and that are respectively aligned with the bypass openings 162 in the stator when the rotor is in an open position (FIGS. 4B and 5B). The rotor also defines a plurality of circumferentially spaced movable vanes 174 joined to the tubular portion and extending axially therefrom, into the nozzle passage 136. The tubular portion of the rotor 170 includes a generally cylindrical portion 176 joined to a generally conical portion 178. The generally cylindrical portion 176 fits into the generally cylindrical portion 166 of the stator 160 and a sealing ring 177 is disposed in a groove defined in a radially outer surface of the generally cylindrical portion 176 for sealing against a radially inner surface of the stator 160. Additionally, there is a second sealing ring 179 disposed in a groove in the radially outer surface of the generally conical portion 178 for sealing against a radially inner surface of the stator. The generally conical portion 178 extends from the generally cylindrical portion 176 in an axially forward (i.e., toward the compressor section of the turbocharger) and radially inward direction. Each of the movable vanes 174 of the rotor 170 overlaps in a circumferential direction with a respective one of the fixed vanes 164 of the stator 160 to form a composite vane having a leading-edge portion defined by the fixed vane 164 and a trailing-edge portion defined by the movable vane 174. The term "movable vane" is not meant to denote that the vane is movable with respect to the rest of the rotor, but rather that the vane moves relative to the fixed vane when the rotor is rotated about the longitudinal axis, as further described below.

The plurality of circumferentially spaced bypass channels 172 are defined in the generally conical portion 178 of the rotor 170. Each bypass channel 172 has an inlet defined at a radially outer side of the rotor, and an outlet that is in fluid communication with the turbine housing bore 132 at a position spaced downstream from the nozzle passage 136 with respect to flow of exhaust gas through the bore 132. In the illustrated embodiment, the outlets of the bypass channels 172 are defined in an end surface of the rotor that extends between radially outer and inner surfaces of the rotor at its downstream end (i.e., the right-hand end in FIG. 5). Furthermore, the bypass channels are configured to discharge exhaust gas from the outlets of the bypass channels into the bore in the turbine housing in a generally axial direction.

Figure 6:
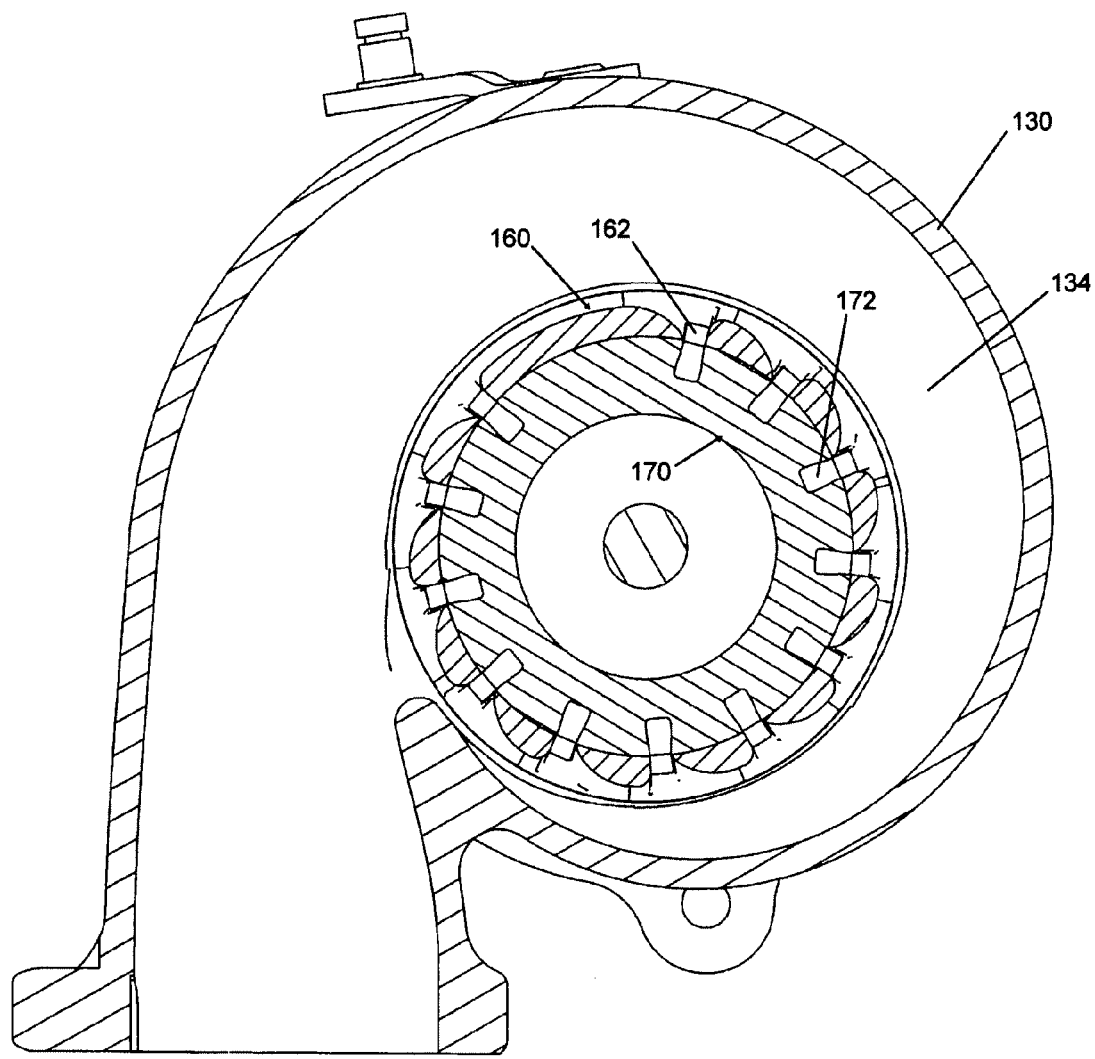
FIG. 6 is a transverse cross-sectional view on a plane perpendicular to the rotational axis of the turbocharger, through the bypass openings and bypass channels of the variable nozzle assembly.

As noted, the rotor 170 is rotatable between a closed position in which the inlets to the bypass channels 172 are closed by the stator 160 (see FIGS. 4A and 5A), and an open position in which the inlets to the bypass channels are aligned with the bypass openings 162 in the stator such that exhaust gas flows from the turbine housing chamber 134 through each bypass opening 162 and through the respective bypass channel 172 into the bore 132, bypassing the turbine wheel 140 (see FIGS. 4B and 5B). In one embodiment, as best seen in FIG. 6, an upstream portion of each bypass opening 162 extends in a direction having a circumferential component, for accommodating an expected degree of swirl existing in the turbine housing chamber 134.

To assemble the variable nozzle, the stator 160 is inserted into the turbine housing bore 132 from a downstream end thereof, and the rotor 170 is inserted into the stator in that same direction. A retaining ring 50 and snap ring 60 are then inserted behind the stator and rotor to retain these parts in place.

Figure 7A:
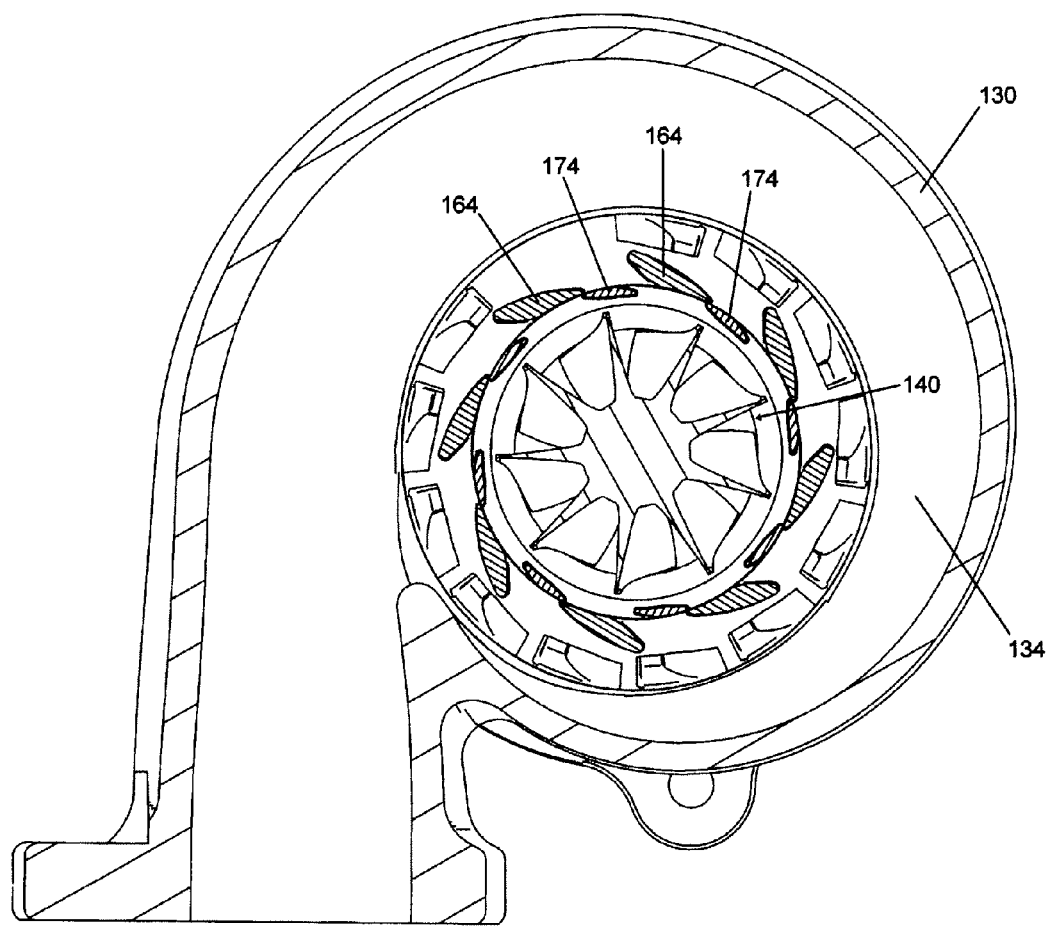
FIG. 7A is a transverse cross-sectional view of the turbocharger, through the vanes of the variable nozzle assembly in the closed position.
Figure 7B:
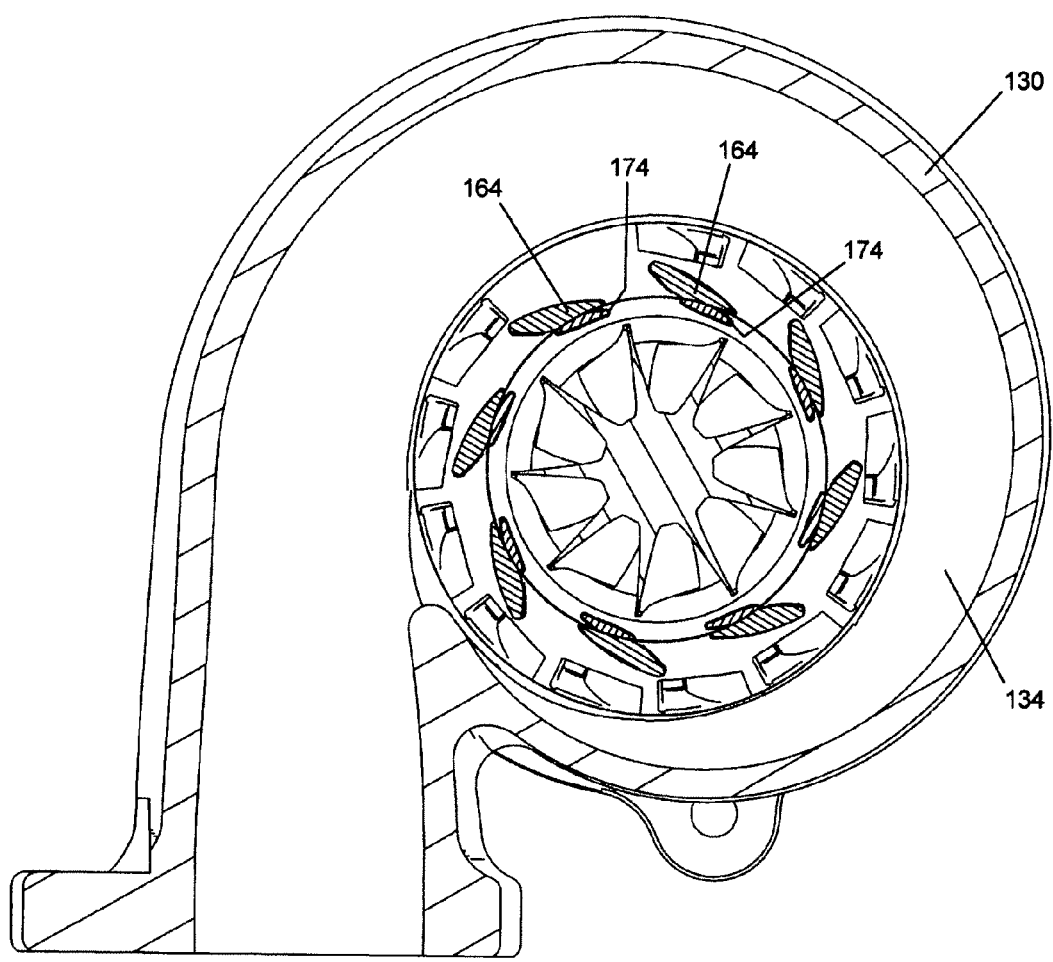
FIG. 7B is similar to FIG. 7A, but in the open (bypass) position.

The movable vanes 174 have a maximum degree of overlap (in the circumferential direction) with the fixed vanes 164 in the open position of the rotor 170 (see FIG. 7B), and have a minimum degree of overlap with the fixed vanes in the closed position of the rotor 170 (see FIG. 7A).

Figure 8:
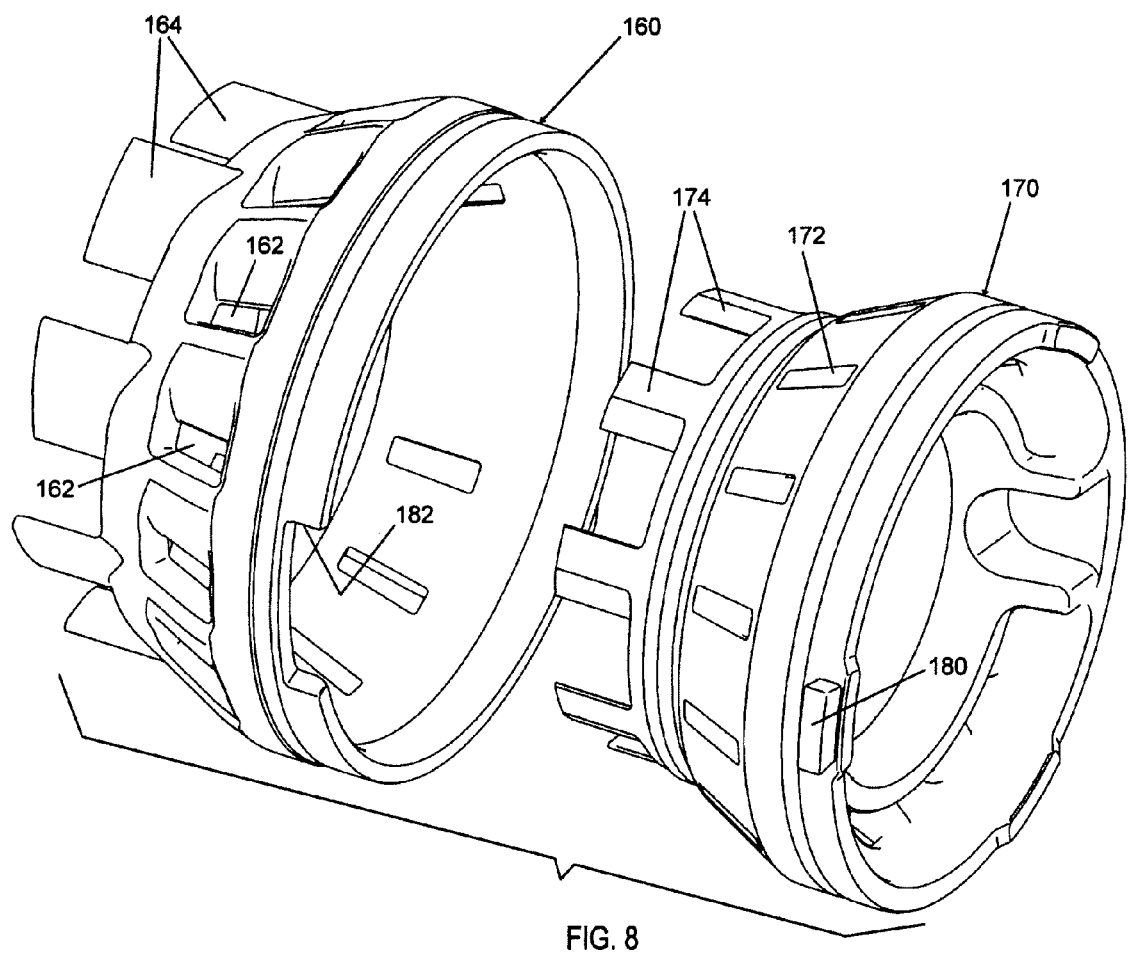
FIG. 8 is an exploded view of the variable nozzle assembly.
Figure 9:
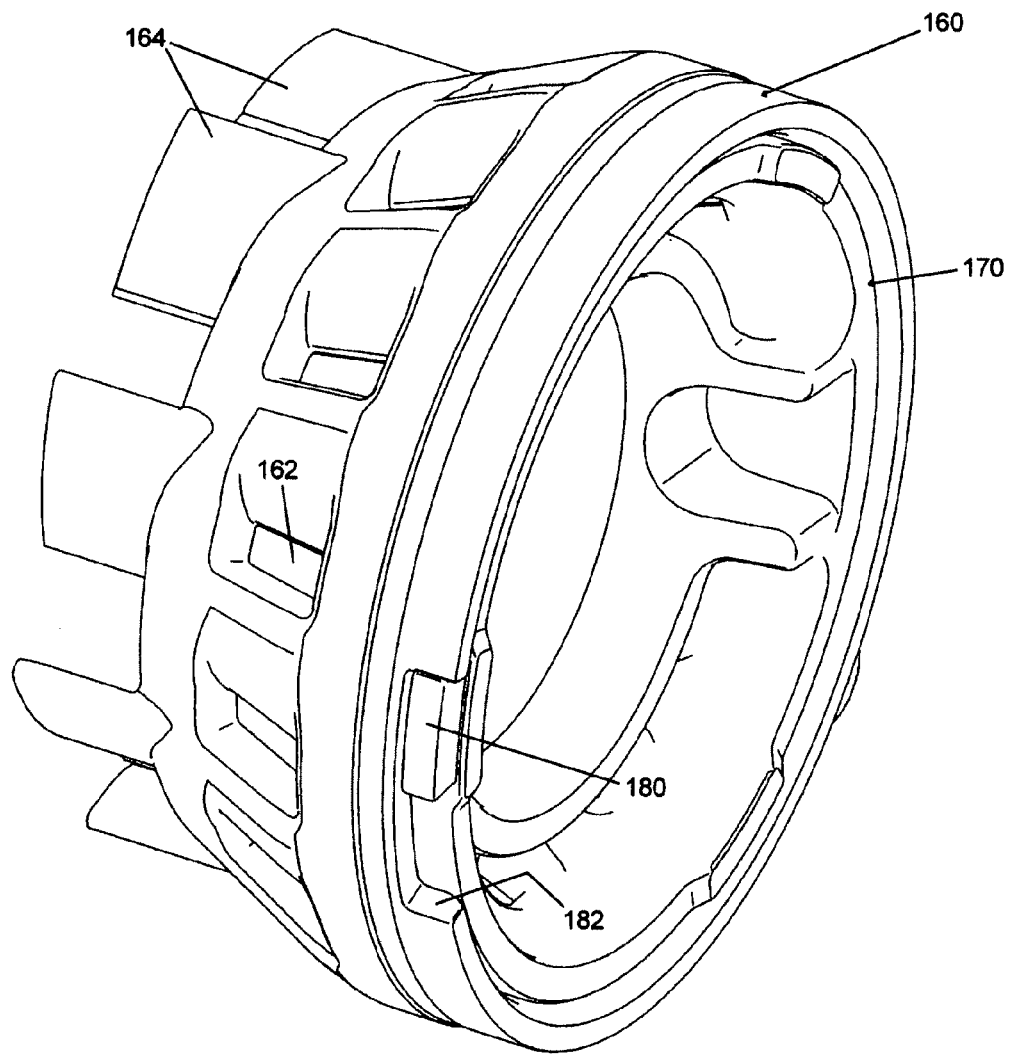
FIG. 9 is a perspective view of the variable nozzle assembly.

In accordance with one embodiment of the invention, the variable nozzle can include a stop for limiting rotation of the rotor 170 between predetermined closed and open positions. The stop is illustrated in FIGS. 8 and 9. The stop comprises a projection 180 from the rotor, and a slot or opening 182 defined in the stator 160, the projection 180 abutting one end of the opening 182 to define the open position of the rotor and abutting an opposite end of the opening to define the closed position of the rotor. Alternatively, the stator could have a projection and the rotor could have an opening receiving the projection, or one of the rotor and stator could have a projection and the other could have a pair of spaced surfaces between which the projection is received.

The stator 160 can include an integral locating projection that engages a receptacle defined in the turbine housing 130 so as to place the stator in a predetermined rotational orientation with respect to the turbine housing.

The turbocharger 100 in accordance with the present invention includes an actuator linkage coupled with the rotor 170 for imparting rotational movement to the rotor. The actuator linkage can include a rotary member 190 (FIG. 3) that extends generally radially inwardly through an aperture 138 in a wall of the turbine housing and is rotational about a generally radial axis. An outer end of the rotary member 190 that extends out from the turbine housing is coupled with a suitable actuator (not shown) for imparting the rotational movement to the rotary member and hence to the rotor 170. The linkage also includes an arm 192 that has one end attached to the inner end of the rotary member 190 and an opposite end engaged with the rotor 170, such that rotation of the rotary member 190 about the generally radial axis causes the arm 192 to pivot and impart rotational movement to the rotor (compare FIGS. 4A and 4B). As shown in FIG. 3, the rotary member 190 extends through a tubular bushing 194 installed in the aperture 138 in the turbine housing wall, which bushing serves as a bearing for rotation of the rotary member.

Another aspect of the invention concerns the configuration of the turbine housing 130. In a typical turbocharger, the generally annular chamber that receives exhaust gas from the engine is defined substantially entirely by the turbine housing, and in particular, the turbine housing typically includes a wall at a radially inner side of the chamber that basically funnels the exhaust gas to the nozzle passage. However, in accordance with the invention in one embodiment, the stator 160 has a radially outer surface that defines part of the generally annular chamber 134, the turbine housing 130 defining the remainder of the generally annular chamber. This is best seen in FIGS. 4A and 4B. In particular, the stator 160 in essence replaces the conventional turbine housing wall at the radially inner side of the chamber 134 that funnels the exhaust gas toward the nozzle passage.

Additionally, in one embodiment of the invention, one of the walls defining the nozzle passage 136 is constituted entirely by the stator 160 and the rotor 170, and in particular by upstream end surfaces of the tubular portions of the stator and rotor. The opposite wall of the nozzle passage is defined at least in part by the turbine housing.

In operation of the turbocharger 100 in accordance with the invention, exhaust gas flow into the turbine wheel 140 is regulated by adjusting the rotational position of the rotor 170 so as to vary the position of the movable vanes 174 relative to the fixed vanes 164. For example, when minimum flow through the turbine is desired at a particular engine operating condition, the rotor is positioned in the fully closed position (FIGS. 4A, 5A, and 7A) so that there is minimum overlap between the movable and fixed vanes, thereby reducing the flow passages between the vanes to a minimum size. When maximum flow through the turbine is desired, the rotor is positioned in the fully open position (FIGS. 4B, 5B, and 7B), which not only maximizes the flow passages between the vanes, but also opens the bypass channels 172 in the rotor 170 so that a proportion of the exhaust gas in the chamber 134 bypasses the turbine wheel 140 and flows directly into the bore 132 in the turbine housing at a location downstream of the nozzle passage 136.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A turbine assembly for an exhaust gas-driven turbocharger having a variable nozzle, comprising:
    a turbine housing defining at least part of a generally annular chamber extending circumferentially about a longitudinal axis of the turbine housing, the turbine housing defining a bore extending along the longitudinal axis;
    a turbine wheel disposed in the turbine housing;
    a nozzle passage leading from the chamber radially inwardly into the turbine wheel, the nozzle passage being defined between two walls spaced apart in a longitudinal direction; and
    a variable nozzle assembly comprising:
        a stator that is fixed in a rotational sense with respect to the turbine housing and that defines a plurality of circumferentially spaced fixed vanes extending into the nozzle passage, the stator defining a bypass opening that is exposed to exhaust gas within the chamber; and
        a rotor that is rotational with respect to the turbine housing about the longitudinal axis, the rotor defining a bypass channel having an inlet and an outlet, the outlet being in fluid communication with the bore at a position spaced downstream from the nozzle passage with respect to flow of exhaust gas through the bore, and wherein the rotor is rotatable between a closed position in which the inlet is closed by the stator and an open position in which the inlet is aligned with the bypass opening in the stator such that exhaust gas flows from the chamber through the bypass opening and through the bypass channel into the bore, bypassing the turbine wheel.

2. The turbine assembly of claim 1, wherein the stator includes a tubular portion that extends circumferentially about the longitudinal axis and defines a plurality of circumferentially spaced bypass openings, and the rotor includes a tubular portion that extends circumferentially about the longitudinal axis and defines a plurality of circumferentially spaced bypass channels that are closed by the stator when the rotor is in the closed position and that are respectively aligned with the bypass openings when the rotor is in the open position.

3. The turbine assembly of claim 2, wherein the rotor defines a plurality of circumferentially spaced movable vanes each of which overlaps in a circumferential direction with a respective one of the fixed vanes to form a composite vane having a leading-edge portion defined by the fixed vane and a trailing-edge portion defined by the movable vane.

4. The turbine assembly of claim 3, wherein the movable vanes have a maximum degree of overlap with the fixed vanes in the open position of the rotor, and have a minimum degree of overlap with the fixed vanes in the closed position of the rotor.

5. The turbine assembly of claim 3, further comprising a stop for limiting rotation of the rotor between predetermined closed and open positions.

6. The turbine assembly of claim 5, wherein the stop comprises a projection from one of the rotor and stator that is disposed in an opening defined in the other of the rotor and stator, the projection abutting one end of the opening to define the open position of the rotor and abutting an opposite end of the opening to define the closed position of the rotor.

7. The turbine assembly of claim 1, wherein the stator includes an integral locating projection that engages a receptacle defined in the turbine housing so as to place the stator in a predetermined rotational orientation with respect to the turbine housing.

8. The turbine assembly of claim 1, further comprising an actuator linkage coupled with the rotor for imparting rotational movement to the rotor.

9. The turbine assembly of claim 8, wherein the actuator linkage includes a rotary member that extends generally radially inwardly through a wall of the turbine housing and is rotational about a generally radial axis, and an arm that has one end attached to the rotary member and an opposite end engaged with the rotor, such that rotation of the rotary member about the generally radial axis causes the arm to pivot and impart rotational movement to the rotor.

10. The turbine assembly of claim 2, wherein the tubular portion of the rotor has a radially outer surface and a radially inner surface, and the tubular portion of the stator has a radially inner surface that contacts the radially outer surface of the tubular portion of the rotor and forms a bearing surface for the rotor.

11. The turbine assembly of claim 10, wherein the tubular portion of the stator includes a generally conical portion at an upstream end of the stator and a generally cylindrical portion at a downstream end of the stator, and the tubular portion of the rotor correspondingly includes a generally conical portion at an upstream end of the rotor and a generally cylindrical portion at a downstream end of the rotor, and wherein the bypass openings are defined in the conical portion of the stator and the inlets of the bypass channels are defined in the conical portion of the rotor.

12. The turbine assembly of claim 10, wherein an upstream portion of each bypass opening extends in a direction having a circumferential component.

13. The turbine assembly of claim 10, wherein the outlets of the bypass channels are defined in an end surface of the rotor that extends between the radially outer and inner surfaces at the downstream end of the rotor.

14. The turbine assembly of claim 13, wherein the bypass channels in the rotor are configured to discharge exhaust gas from the outlets of the bypass channels into the bore in the turbine housing in a generally axial direction.

15. The turbine assembly of claim 1, wherein the stator has a radially outer surface that defines part of the generally annular chamber, the turbine housing defining the remainder of the generally annular chamber.

16. The turbine assembly of claim 15, wherein one of the walls defining the nozzle passage is constituted entirely by the stator and the rotor.

* * * * *